United States Patent [19]
Nilsen et al.

[11] Patent Number: 6,139,158
[45] Date of Patent: *Oct. 31, 2000

[54] RETROREFLECTIVE ARTICLES WITH MULTIPLE SIZE PRISMS IN MULTIPLE LOCATIONS

[75] Inventors: Robert B. Nilsen, Weatoque; Michael Hanrahan, Danbury, both of Conn.

[73] Assignee: Reflexite Corporation, Avon, Conn.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/909,637

[22] Filed: Aug. 12, 1997

Related U.S. Application Data

[63] Continuation-in-part of application No. 08/507,599, Jul. 26, 1995, Pat. No. 5,657,162.

[51] Int. Cl.⁷ .................................................. G02B 5/124
[52] U.S. Cl. .................... 359/530; 359/529; 359/900; 359/515; 359/520; 359/531; 359/532; 359/533
[58] Field of Search .................................... 359/515–526, 359/529–533, 900, 831, 833, 834; 156/247, 60; 264/1.9; 428/161, 167, 172

[56] References Cited

U.S. PATENT DOCUMENTS

| | | | |
|---|---|---|---|
| Re. 30,892 | 3/1982 | Bingham et al. | 428/241 |
| 2,167,149 | 7/1939 | Grote | 40/135 |
| 3,374,044 | 3/1968 | Benson . | |
| 3,388,027 | 6/1968 | Altman | 161/4 |
| 3,420,597 | 1/1969 | Nellessen et al. . | |
| 3,493,286 | 2/1970 | Bacon . | |
| 3,496,006 | 2/1970 | Rideout et al. | 117/45 |
| 3,567,307 | 3/1971 | Rideout et al. . | |
| 3,614,199 | 10/1971 | Altman . | |
| 3,684,348 | 8/1972 | Rowland . | |
| 3,700,305 | 10/1972 | Bingham . | |
| 3,802,944 | 4/1974 | Tung | 161/3.5 |
| 3,924,929 | 12/1975 | Holmen et al. . | |
| 3,975,083 | 8/1976 | Rowland . | |
| 4,025,159 | 5/1977 | McGrath . | |
| 4,082,426 | 4/1978 | Brown . | |
| 4,099,838 | 7/1978 | Cook et al. . | |
| 4,145,112 | 3/1979 | Crone et al. . | |
| 4,153,412 | 5/1979 | Bailey | 8/2.5 A |
| 4,555,161 | 11/1985 | Rowland . | |
| 4,618,518 | 10/1986 | Pricone et al. | 428/40 |
| 4,637,950 | 1/1987 | Bergeson et al. | 428/168 |
| 4,763,985 | 8/1988 | Bingham . | |
| 4,801,193 | 1/1989 | Martin . | |
| 5,229,882 | 7/1993 | Rowland | 359/530 |
| 5,264,063 | 11/1993 | Martin | 156/247 |
| 5,412,187 | 5/1995 | Walters et al. | 219/728 |
| 5,657,162 | 8/1997 | Nilsen et al. | 359/530 |

FOREIGN PATENT DOCUMENTS

| | | |
|---|---|---|
| 2245985 | 1/1992 | United Kingdom . |
| WO97/05509 | 2/1997 | WIPO . |

*Primary Examiner*—James Phan
*Attorney, Agent, or Firm*—Hamilton, Brook, Smith & Reynold, P.C.

[57] ABSTRACT

Retroreflective sheeting and articles are formed in which the size of the retroreflective and non-retroreflective surfaces may be varied across an array of microprisms. This is accomplished by varying the location of the reflective coating applied to the microprism side facets, such that, some prism side facets are completely coated with reflective material while others are coated only at the apex area; and still others are coated with a non-reflective coatings, such as, a colored adhesive.

17 Claims, 11 Drawing Sheets

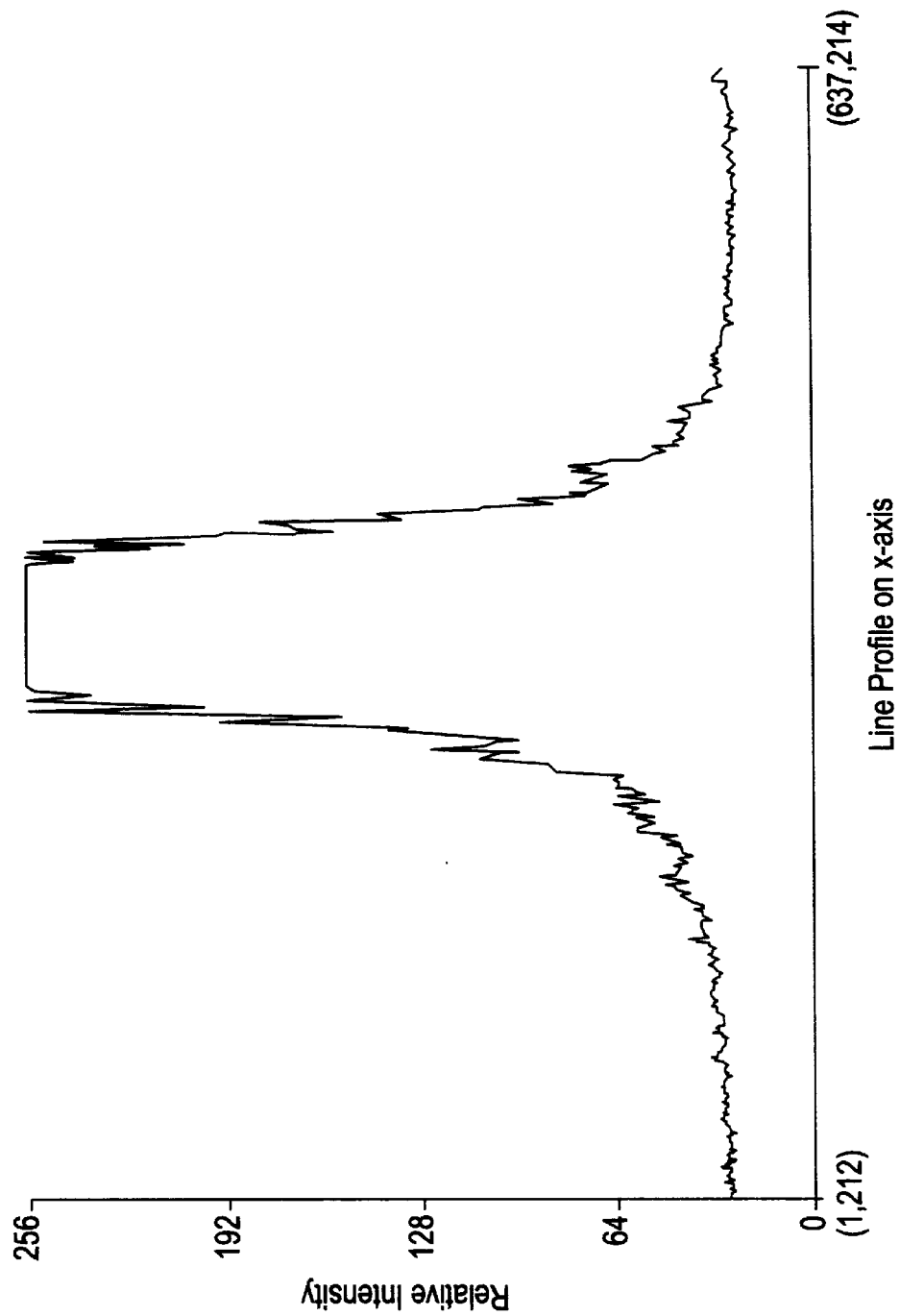

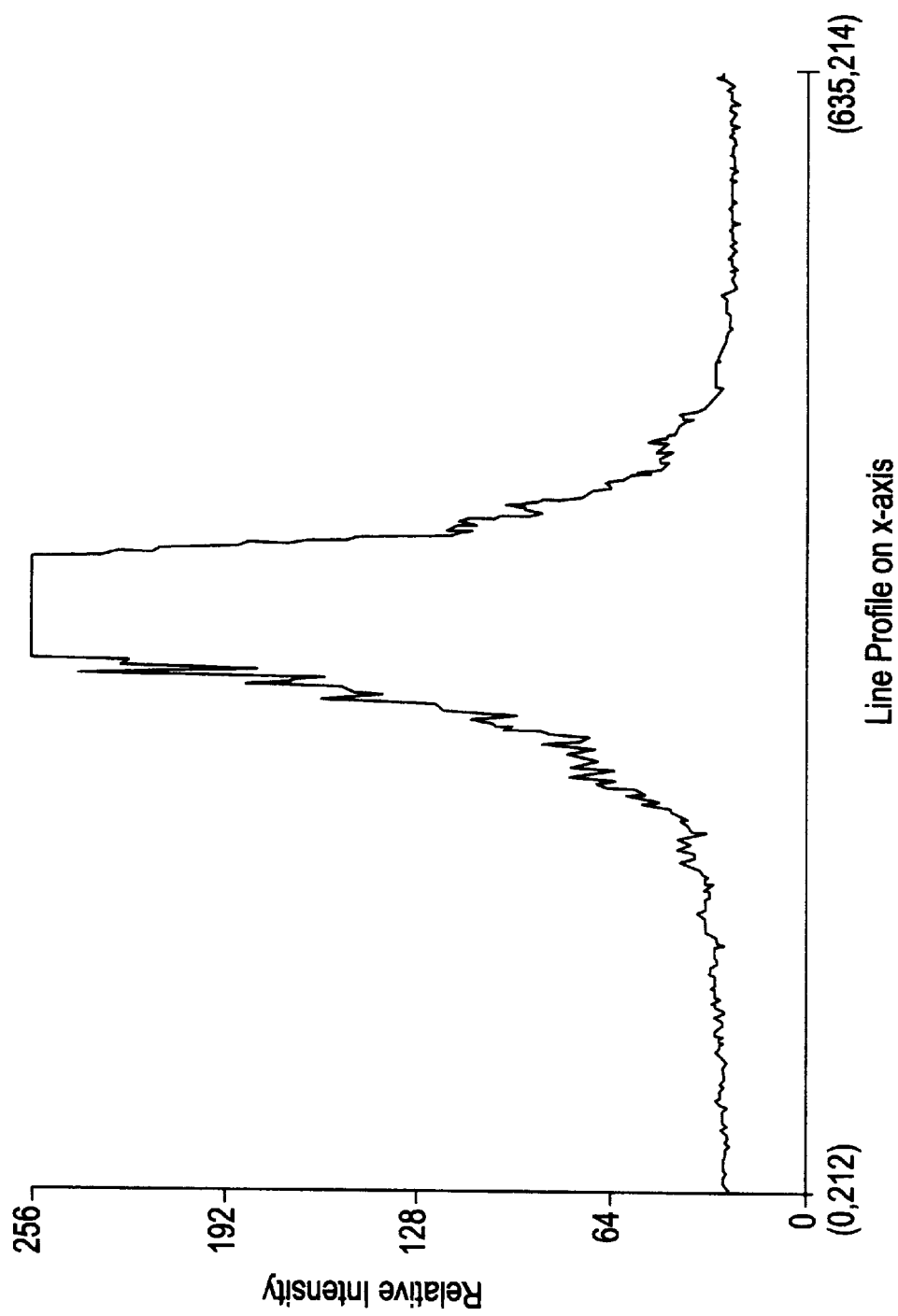

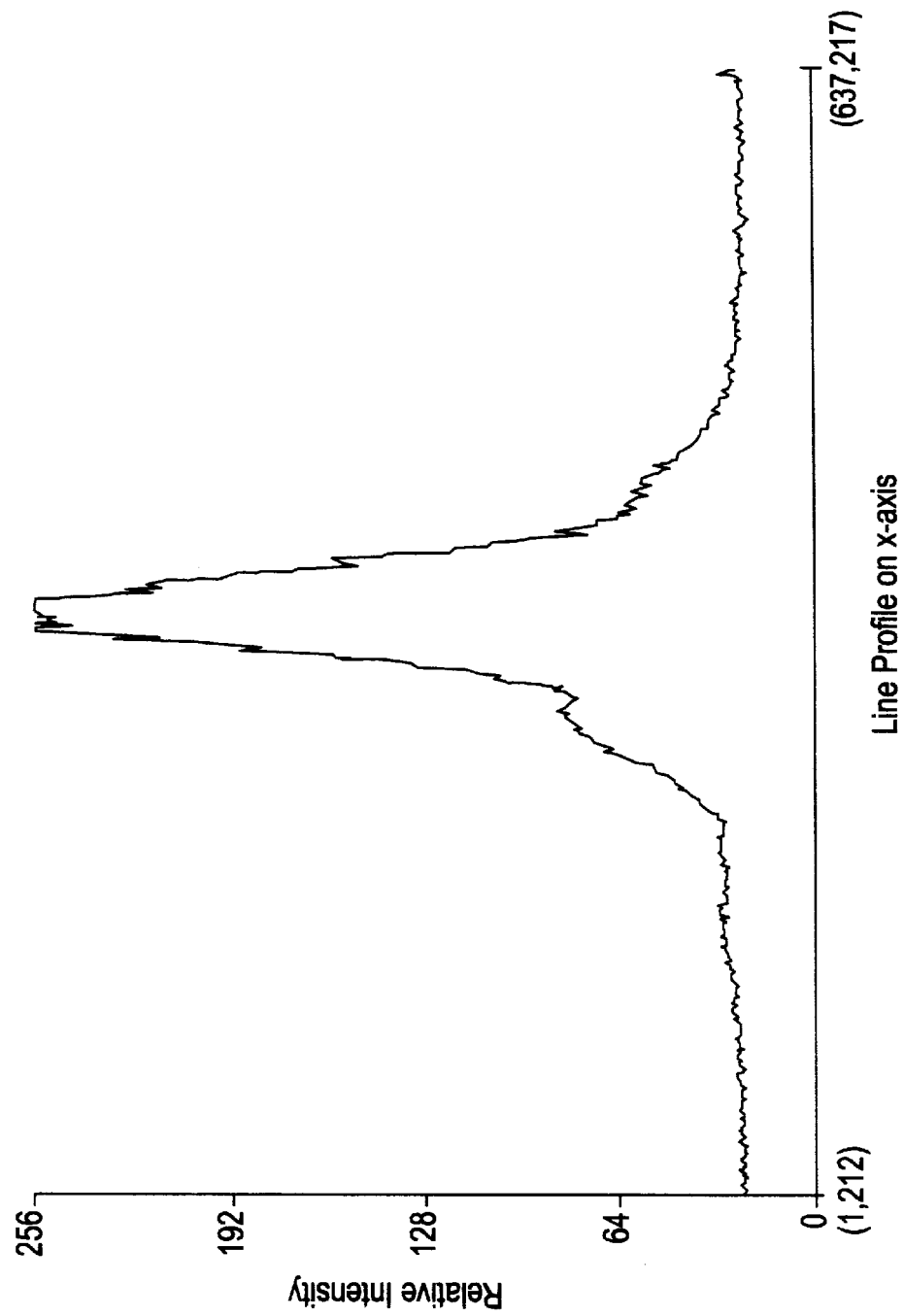

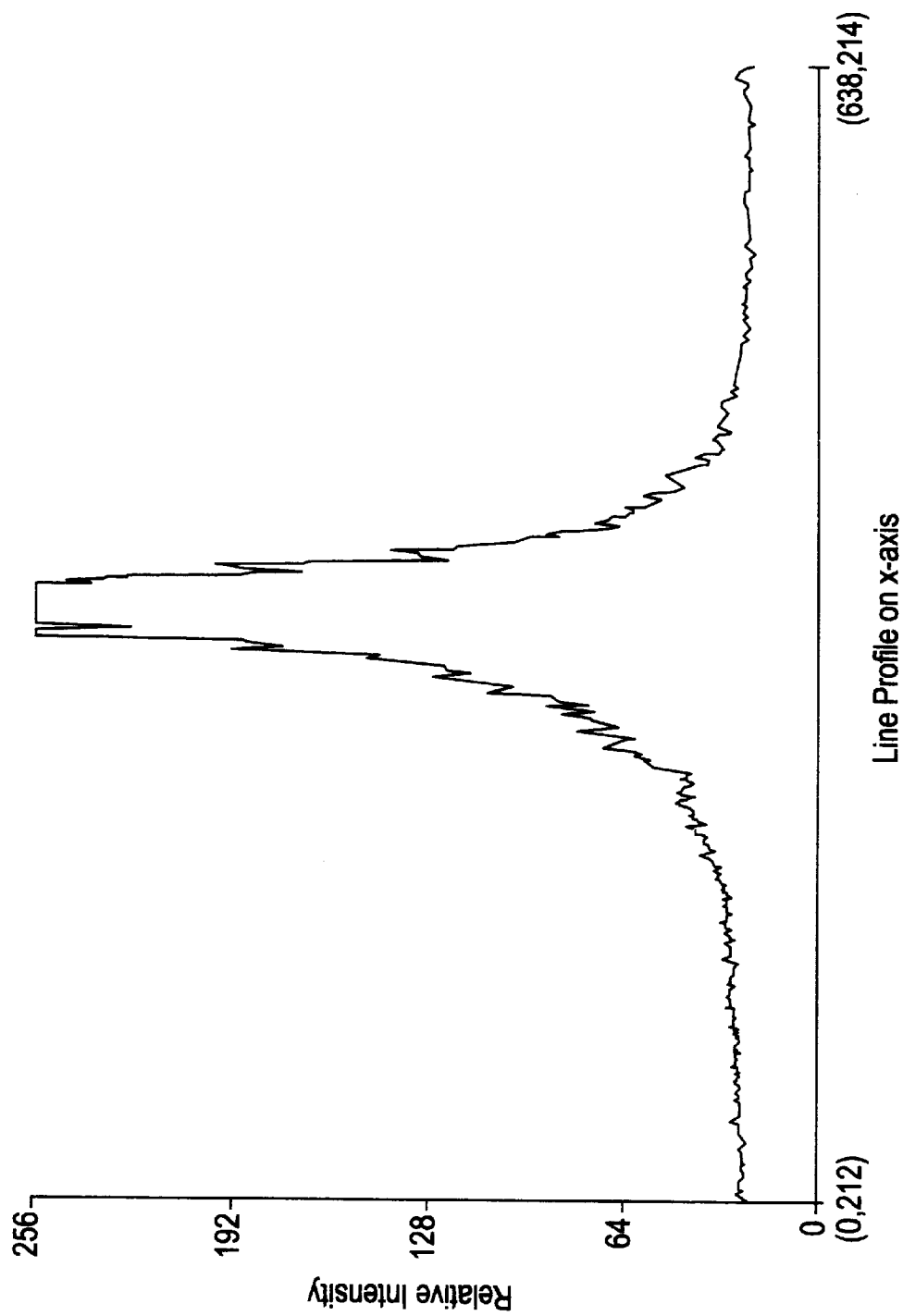

RETROREFLECTIVE ARTICLES WITH MULTIPLE SIZE PRISMS IN MULTIPLE LOCATIONS

RELATED APPLICATIONS

This application is a continuation-in-part of U.S. patent application Ser. No. 08/507,599, filed on Jul. 26, 1995, now U.S. Pat. No. 5,657,162, the teachings of which are herein incorporated by reference in their entirety.

BACKGROUND OF THE INVENTION

Retroreflective sheet material is widely employed for a variety of safety and decorative purposes, and is particularly useful when the need for night time visibility is significant under conditions of low ambient light. In retroreflective materials, the light rays impinging upon the front surface are reflected back towards the source of the illumination in a substantially parallel path. In situations where headlights or search lights on boats and aircraft are the only source of illumination, this ability to retroreflect the bulk of the rays falling thereon is especially significant for warning signs.

Among the applications for such retroreflective materials are reflective tapes and patches for clothing of firemen, reflective vests and belts, bands for posts and barrels, traffic cone collars, highway signs, warning reflectors, and the like.

In U.S. Pat. No. 4,801,193, granted Jan. 31, 1989 and incorporated herein in its entirety by reference, there is described in detail a partially retroreflective sheet producing process in which grid patterns of metallized and unmetallized prisms are formed, and the use of adhesive spacing to provide an air backing for unmetallized prisms.

U.S. Pat. No. 5,229,882, granted Jul. 20, 1993 and incorporated herein in its entirety by reference, describes in detail a process for producing retroreflective microprism material providing a visual coloration, wherein some of the microprisms have a retroreflective interface and the remainder have a colored non-reflective coating thereon.

As a result, light rays entering the front or base face which impinge upon the prism side facets having retroreflective interfaces are redirected so that they exit the material in a parallel path i.e. retroreflect. Light rays which travel to the facets of color coated prisms are refracted from those prisms and impart a visual coloration to the material in daylight and ambient light.

SUMMARY OF THE INVENTION

In accordance with the present invention, retroreflective sheeting and articles are formed of multiple size prismatic reflectors located in multiple locations. The multiple size reflectors are formed by selectively applying a reflective coating to the side facets of selected portions of microprisms in an array, followed by application of a colored adhesive coating to the uncoated facets of the array.

Certain of the prism facets in the array are only reflectively coated in the tip area of the prism facets, where the side facets meet at the apex. Such prisms will retroreflect like a small prism versus areas where the entire prism side facets surface is coated. Uncoated areas with a colored adhesive backing will diffusely reflect light.

The pattern of reflecting coating applied can be of any shape or format, can be random in shape or format, or can be registered so that the prism facets are coated in a precision pattern. The coating is preferably a metallic reflective coating of material, such as, aluminum, silver, copper, etc.

The result is a retroreflecting material which creates a uniform light pattern (the result of the different size retroreflecting prism facets created) and a material that has a high degree of color (the result of the colored adhesive wetting the transparent uncoated facet surfaces of the prisms).

Alternatively, the adhesive backing can be spaced away from the patterned metallized prism facets to allow an air space so that the index of refraction change from prism material to air allows the uncoated portions of the prism facets to specularly reflect light.

BRIEF DESCRIPTION OF THE DRAWINGS

FIG. 17 is a plot of light intensity along the x-axis of a retroreflective structure with an application of no chemical formulation.

FIG. 18 is a plot of light intensity along the x-axis of a retroreflective structure with an application of a little amount of chemical formulation.

FIG. 19 is a plot of light intensity along the x-axis of a retroreflective structure with an application of a moderate amount of chemical formulation.

FIG. 20 is a plot of light intensity along the x-axis of a retroreflective structure with an application of a lot of chemical formulation.

DETAILED DESCRIPTION OF THE INVENTION

The features and details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

Figure 1:
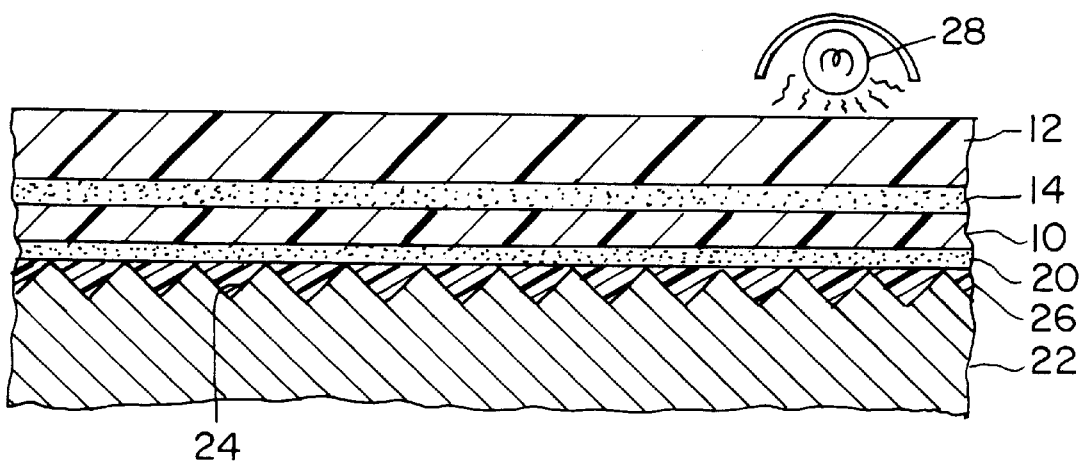
FIG. 1 is a partially diagrammatic illustration of an early step of a prior art embodiment of a process for forming a retroreflective material.

Turning first to FIG. 1, the first steps in the process of the invention is similar to that of the prior art depicted in the aforementioned U.S. Pat. No. 5,229,882. A thin flexible sheet material body member 10 is temporarily laminated to a relatively thick carrier sheet 12 by an adhesive layer 14 which preferentially adheres to the carrier sheet 12. In this step, the thick carrier sheet 12 has been precoated with the adhesive 14 and is passed through the nip of a pair of laminating rollers (not shown) with the body member 10.

In the next step (not shown), the lower or opposite surface of the body member 10 is provided with a thin tie coat 20 of synthetic resin. This coated laminate is then pressed against the surface of a mold 22 with closely spaced microprism recesses 24 formed therein in which is deposited a transparent fluid synthetic resin composition. The assembly is exposed to heat or ultraviolet rays from the lamps 28 to cure the fluid resin composition to form solid microprism formations 26 on the surface of body member 10.

Figure 2:
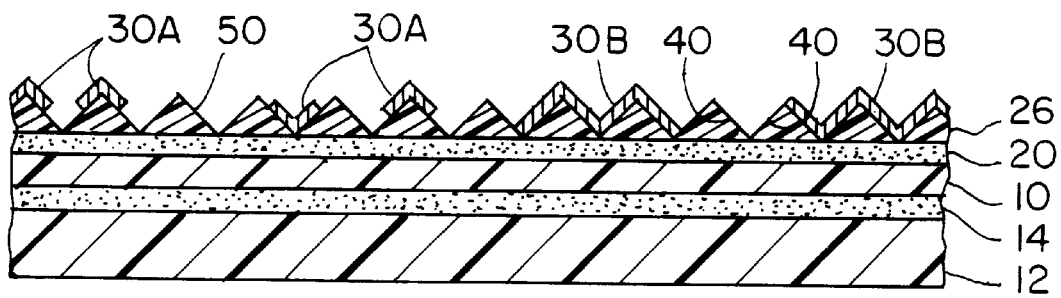
FIG. 2 is a similar illustration of a subsequent step in which a reflective metallic deposit has been formed on certain portion of the microprism formations formed in FIG. 1.

In the illustrated embodiment of the process, the sheet material is stripped from the surface of the mold 22 and inverted, then vacuum metallized or otherwise treated to selectively form transparent reflective metallic deposits 30A–30B on the surface of the microprism formations 26, as seen in FIG. 2.

Figure 3:
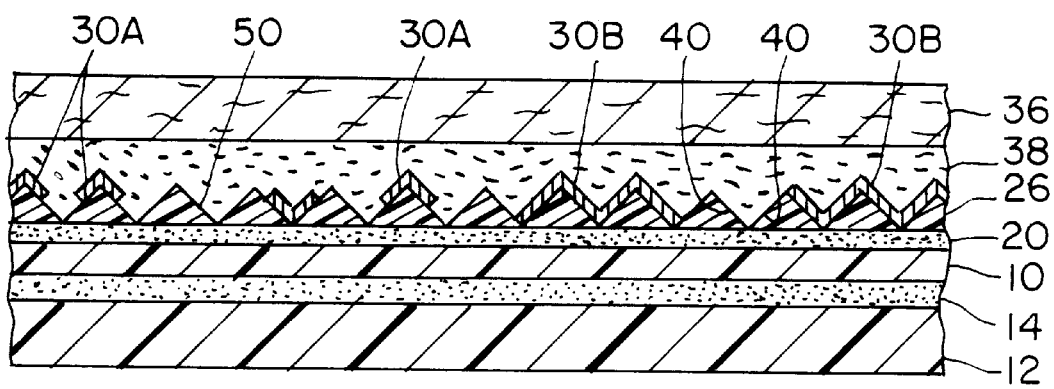
FIG. 3 is a similar illustration showing a colored adhesive coating material deposited over the entire back surface of the sheet material of FIG. 2 and a fabric layer adhered thereto.

In FIG. 3, a laminate is formed in which an optional flexible fabric 36 is bonded to the structure of FIG. 2 by a coating 38 of colored adhesive disposed over the entire surface of the microprism side facets. Thus, this coating 38 is in direct contact with those microprisms 26 which do not have the metallic deposit 30A–30B.

Figure 4:
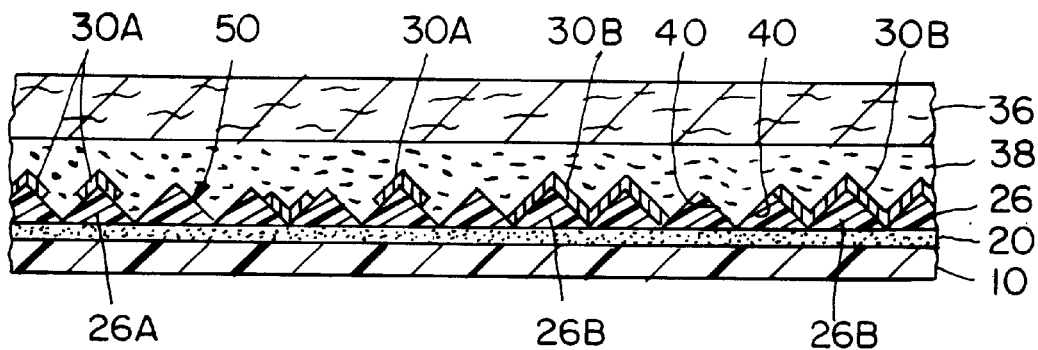
FIG. 4 is a similar illustration showing the removal from FIG. 3 of the carrier sheeting.

In FIG. 4, the carrier 12 and its adhesive bonding layer 14 have been stripped from the transparent fabric member 10 and sheet 12 supporting the microprism bodies 26 leaving some prisms 50 uncoated.

The microprisms 26 are closely spaced and can be described as cube corner formations. Details concerning the structure and operation of such microprisms can be found in U.S. Pat. No. 3,684,348, issued to Rowland on Aug. 15, 1972. These microprisms or cube corner formations can have a side edge dimension of up to 0.025 inches, but the preferred structures use edge dimensions of not more than 0.007 inches, and most desirably on the order of 0.005 inches.

The body member of the sheeting will generally have a thickness on the order of 0.010 inches and preferably about 0.006 and 0.02 inches when a highly flexible laminate is to be formed, depending upon the method of fabrication, the resins, and other characteristics desired for the retroreflective sheeting.

The microprism sheeting may be formed by casting prisms upon a film surface functioning as the body, as described above, or by embossing a preformed sheeting, or by casting both body and prisms concurrently. Generally, the resins employed for the microprism sheeting are cross linked thermoplastic and thermoset formulations, and desirably these resins provide flexibility, light stability, and good weathering characteristics. In some instances, the front face of the retroreflective sheeting may be provided with a protective coating such as by application of a lacquer or other coating material. Suitable resins for the retroreflective sheeting include vinyl chloride polymers, polyesters, polycarbonates, methyl methacrylate polymers, polyurethanes, acrylated urethanes and acrylated epoxies.

To protect the relatively thin body member during processing, the relatively thick carrier temporarily bonded thereto will generally have a thickness of between 0.005 and 0.008 inches. The adhesive used to effect the bonding therebetween preferentially adheres to the carrier and is conveniently a silicon adhesive applied to a thickness of between about 0.00025 and 0.0005 inches. When ultraviolet curing of the resin in the prism is employed, the adhesive must be transparent to the light rays. Although various resins may be employed for the carrier, polyesters and particularly polyethylene terepthalate are desirably employed because of their toughness and relative resistance to processing conditions. As with the adhesive, the carrier should be transparent to the ultraviolet radiation used to effect curing. Moreover, the surface of the carrier may be treated to enhance the preferential adhesion of the adhesive to the surface of the carrier.

As is known, the reflective interface for the prisms may be provided by a reflective coating of metal or by an air interface. In the preferred embodiment of the present invention, a reflective coating is provided only upon selected portions of the surfaces of at least some of the microprisms, and such reflective coatings have most commonly been vacuum metallized aluminum deposits, although metallic lacquers and other specular coating materials may also be used.

Figure 6:
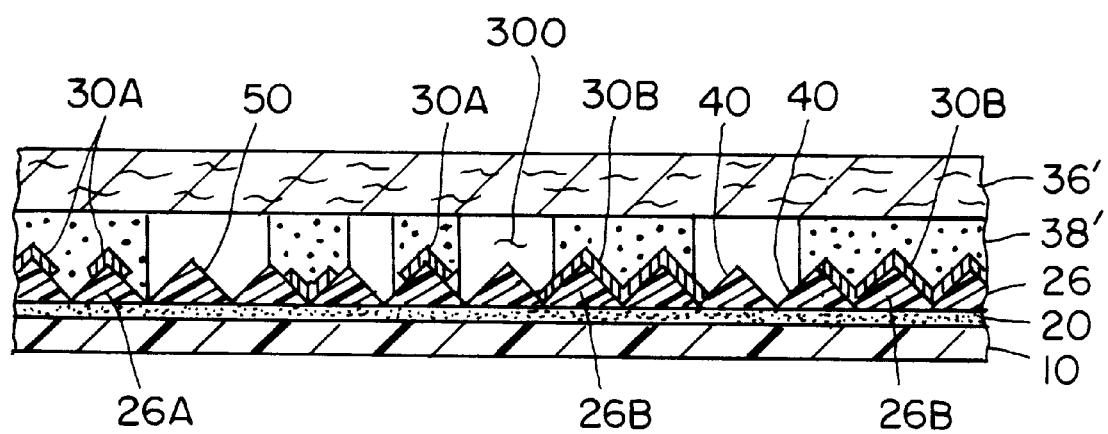
FIG. 6 is an enlarged partial sectional view of an alternate embodiment of the invention.

Alternatively, as shown in FIG. 6, the adhesive backing 36' can be spaced away from the patterned metallized prism facets to allow an air space 300 so that the index of refraction change from prism material to air allows the uncoated portions of certain of the prism facets, for example prism 50, to specularly reflect light.

In one embodiment, the vacuum metallized prism surface is printed in a coating apparatus with a grid-like pattern.

Pattern metallizing can be used to vacuum coat just the tip of the prism in a number of ways. One way is to create a very small metallized area, in the order of a 0.004 inch dot or triangles and register the metallizing so that it is on the tip of the prism. Also a random pattern of dots spaced apart by unequal distances can be created such that no matter how the pattern is located on the prism array some of the dots will be located on the tops of the prisms. Another method is to create a pattern that is a series of lines which vary in width, from 0.004 to 0.050 inches for example, so that some prisms are metallized with a narrow width area and others are metallize with a wider width area. The lines in the pattern would be present in multiple directions, for example three directions 60 degrees apart, and differentially spaced such that no matter how the pattern occurs on the prism array some small, some large and groups of large prisms will be created.

A preferred method of pattern metallizing the deposits 30A–30B of FIG. 2 is to pass the sheeting, upon which the exposed prism formations 26 have been formed, through rollers which cause a negative image in oil of the desired pattern. The sheeting then passes by a metallizing deposition apparatus. The oil pattern prevents local metal deposits, however metal is printed or deposited in regions not covered by oil. See U.S. Pat. No. 5,412,187, issued to Walters et al. on May 2, 1995.

In either of the techniques, the result is that some of the microprism facets 40 are partially coated, others are completely coated with the reflective deposit 30A and 30B, respectively, and the remaining prism surfaces 50 are free from any reflective coating.

A colored non-reflective light dispersive adhesive coating 38 is then applied over the entire prism surface and directly coats the side facets of unmetallized prisms or prism portions. Thereafter, the backing fabric material 36 is applied.

In an alternate embodiment as shown in FIG. 6, a colored adhesive 38' is applied in a pattern to the prism surfaces and to a depth greater than the height of the prisms. When the backing fabric 36' is laminated thereto, it is spaced from the prisms by the adhesive 38' and this provides an air interface 300 about the uncoated prisms 50, so that light may be retroreflected therefrom.

The backing 36 can be a woven or laid fabric, or a flexible, durable polymeric material. Suitable resins include polyethylene, polypropylene, polyurethanes, acrylated polyurethanes and ethylene/vinyl acetate copolymers. Polyester and urethane fabrics can be employed as well as those of natural fibers such as cotton. Flame retardants can be incorporated in the adhesives as well as in the fabric backing 36 to impart flame retardance to the retroreflective material.

Although other metals may be used to provide a specular metal deposit including silver, rhodium, copper, tin, zinc, and palladium, the preferred and most economical processes utilize aluminum vacuum deposition. Other deposition techniques include electroless plating, electroplating, ion deposition and sputter coating.

The step of adhering the backing to the retroreflective sheeting may simply involve passing the adhesively coated retroreflective sheeting through the nip of a pair of rolls together with the backing material 26 to apply the necessary pressure to effect adhesion. If a heat activatable adhesive is employed, the retroreflective sheeting may be subjected to preheating prior to passage through the rolls, or the rolls may be heated to achieve the necessary activation. However, it is also practicable to employ ultrasonic welding and other techniques to bond the backing material to the retroreflective sheeting by the material of the backing material itself when it is thermoplastic.

To provide a coloration to the retroreflective light at night, a dye may be incorporated in the resin used to form the body member 10, or the tie coat 20, or even the prisms 26. As an alternative to a dye and as an effective necessity in some resin systems, the coloration may be provided as a finely divided pigment which is well dispersed; however, some loss in retroreflectivity will occur as the result of refraction by pigment particles which are directly in the path of light rays.

The different size retroreflective prism surfaces may be observed in FIG. 4 from a comparison of the metal backing 30A on the tips of the prism 26A versus the complete metallization 30B on prism 26B. The un-metallized area 50 between the metallized prism facet areas 30A or 30B which is backed by a colored adhesive 38 forms a diffuse reflecting surface rather than the normal specular reflectory surface formed when the prism facets are air backed or vacuum coated with reflective metal coating.

A retroreflective film which consists of one or multiple layers of retroreflective films which are pattern metallized and laminated together with transparent films or adhesives can be made. The laminated films can contain different sizes of prisms in each retroreflecting layer creating excellent short and long distance retroreflective performance. The clear film or adhesive used during the lamination process must have an index of refraction which is close to the index of refraction of the material used to form the prism.

Figure 5:
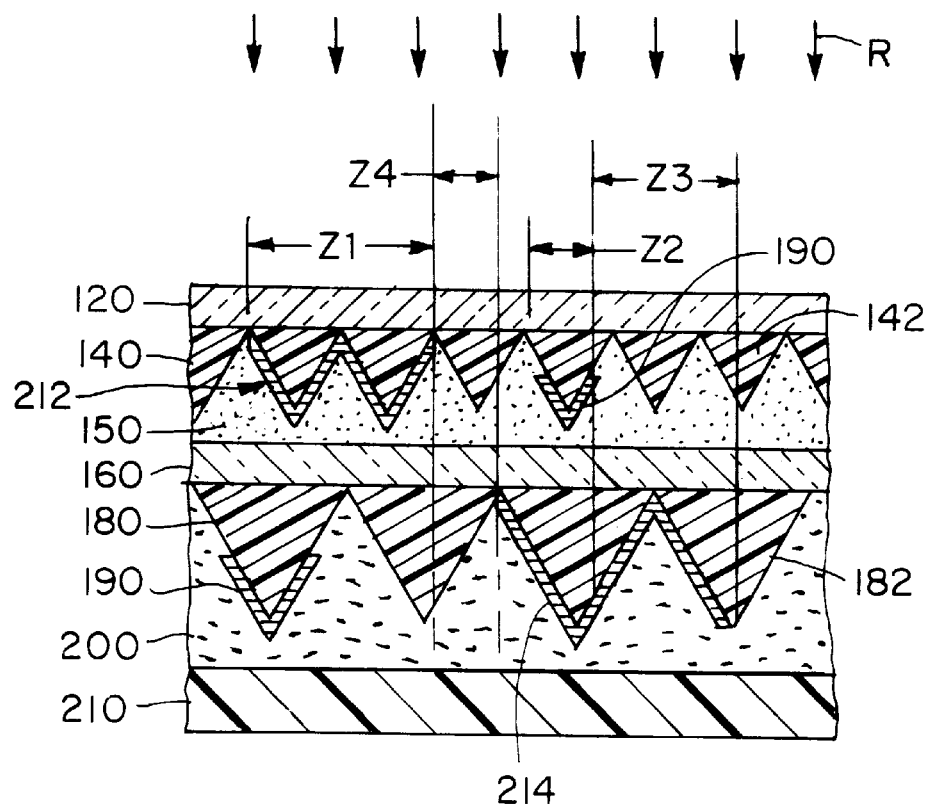
FIG. 5 is a partially enlarged sectional view of an alternate multilayer embodiment of the invention.

An example of one such alternate embodiment is shown in FIG. 5 wherein numeral 120 indicates a transparent top, or outer film 0.0001 to 0.020 inches in thickness. Numeral 140 denotes a first prism layer of retroreflecting prisms 142 of a size smaller than the prisms 182 in second prism layer 180. Numeral 150 is a layer of transparent adhesive which has an index of refraction equal (approximately) to the index of a refraction of the prisms 142 in layer 140. Numeral 160 is a layer of transparent film 0.0001 to 0.020 inches in thickness. A thick film is preferred for this layer. Second prism layer 180 is a layer of retroreflective prisms 182 of a size greater than the prisms 142 in layer 140. An aluminum or other reflective coating 190 is applied to some of the retroreflecting prisms 142 and 182, respectively, in layers 140 and 180 using the previously described pattern metallizing process.

The small reflective coated prisms 142 in layer 140 are approximately 0.001 to 0.005 inches in pitch and designed to provide wide observation angle performance. The large reflective coated prisms 182 in layer 180 are 0.004 to 0.008 inches in pitch and provide narrow observation angle performance.

Layer 200 is preferably formed of an opaque white adhesive which bonds prism layer 180 to substrate 210.

In zone Z1 the incoming light rays R will be retroreflected from the large metallized prism reflectors 212 of layer 140. In zone Z2 light rays R are reflected off small prism reflector 190.

In zone Z3 the light will pass through layer 140, because of the index matching adhesive 150 and transparent film layer 160, and retroreflect from the much larger metallized prism facets 214 in layer 180.

In zone Z4 the light will pass through both layers of prisms 140 and 180 and diffusely reflect from the white adhesive layer 200 contributing to the whiteness (Cap Y) of the retroreflecting structure.

The structures described above can be expanded to include more layers of partially metallized retroreflecting prisms. The prism can be of various sizes in each layer, the metallic coating used may be different in each layer, and the area of pattern metallizing in each layer can be varied to change the retroreflecting or whiteness (Cap Y) properties of the overall retroreflecting structures.

The above-described sheeting can be used to form structures, such as traffic control materials, vehicle markings, photoelectric sensors, internally illuminated articles, partially light transmissive signs, directional reflectors, garments and marking.

In another embodiment, a colored pattern is printed on the prism side of the retroreflective structure with various amounts of colored printed material leaving the tip areas of the prisms free and clean of the colored printing material (the reflecting properties of the faces). The prism side of the film is vacuum metallized with aluminum or other reflecting metal creating various size metallized prisms with colored material in between each prism. A very uniform in appearance retroreflective film with the advantage of the various size prisms providing uniform brightness at all observation and orientation angles can be created in this manner.

A chemical formulation (colored printing material) is applied to the prism side (prism apex out from film) of a polyester film which has acrylated epoxy cube-corner retroreflecting prisms cured and bonded to the film. An example of a chemical formulation is a titanium dioxide ($TiO_2$) dispersion in a water-borne urethane-based formulation. The urethane can be a Zeneca NEOREZ-960 Product available from Zeneca Resins of Wilmington, Mass. An air drying crosslinking agent can be employed. The chemical formulation is allowed to flow down into the grooves between the prisms and is cured. The amount or degree of retroreflectivity through the front (non-prism side) of the film is measured.

Figure 7:
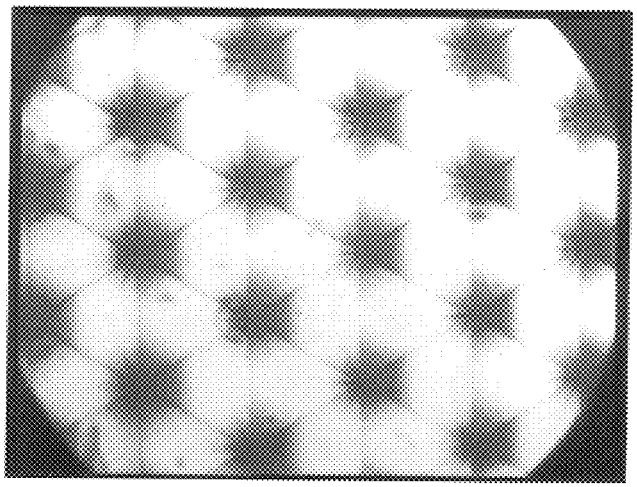
FIG. 7 is a front view of an embodiment of a retroreflective structure with an application of no chemical formulation.
Figure 12:
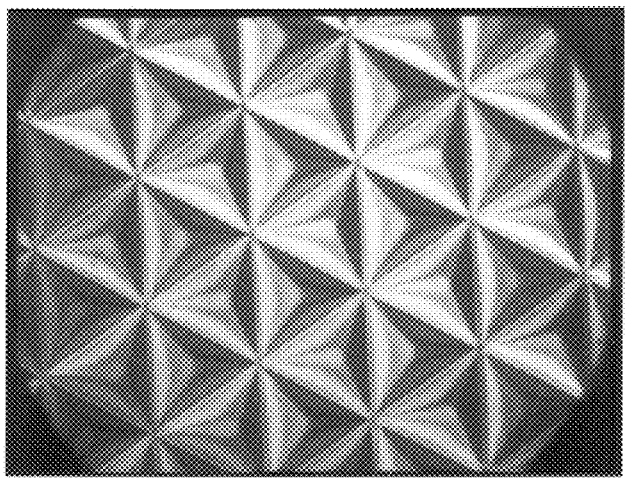
FIG. 12 is a rear side (prism apex side) view of a retroreflective structure with an application of no chemical formulation.

Sample A represents clean prisms shown in FIGS. 7 and 12. No chemical formulation has been applied to the retroreflective structure.

Figure 8:
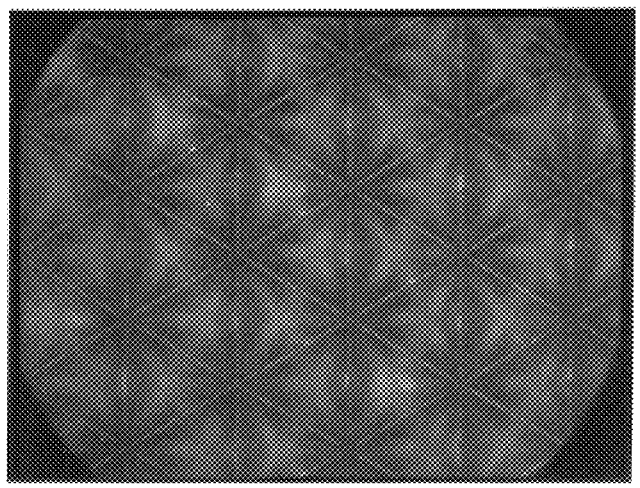
FIG. 8 is a front view of the retroreflective structure with an application of a little amount of chemical formulation.
Figure 13:
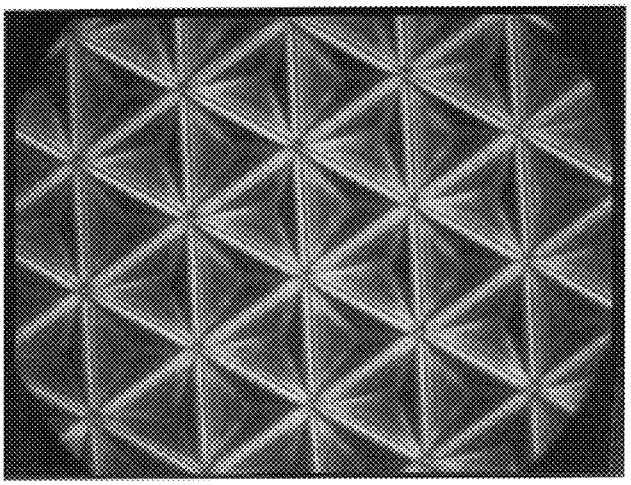
FIG. 13 is a rear side (prism apex side) view of the retroreflective structure with an application of a little amount of chemical formulation.

Sample B represents very little application of the chemical formulation to the retroreflective structure shown in FIGS. 8 and 13.

Figure 9:
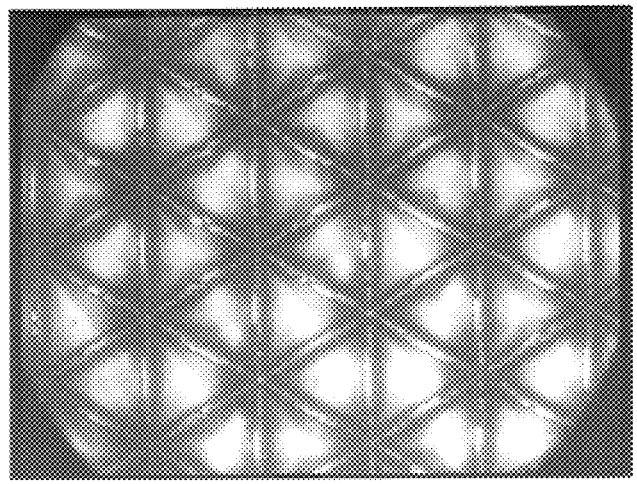
FIG. 9 is a front view of the retroreflective structure with an application of a moderate amount of chemical formulation.
Figure 14:
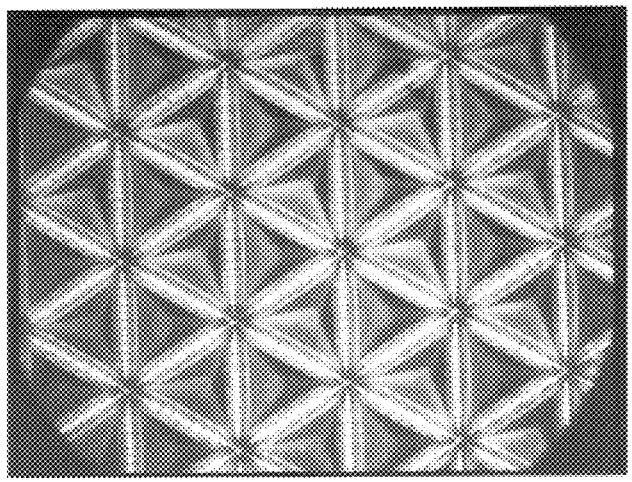
FIG. 14 is a rear side (prism apex side) view of the retroreflective structure with an application of a moderate amount of chemical formulation.

Sample C represents a moderate amount of chemical formulation applied to the retroreflective structure, shown in FIGS. 9 and 14. A moderate amount can be about half the height of the prisms.

Figure 10:
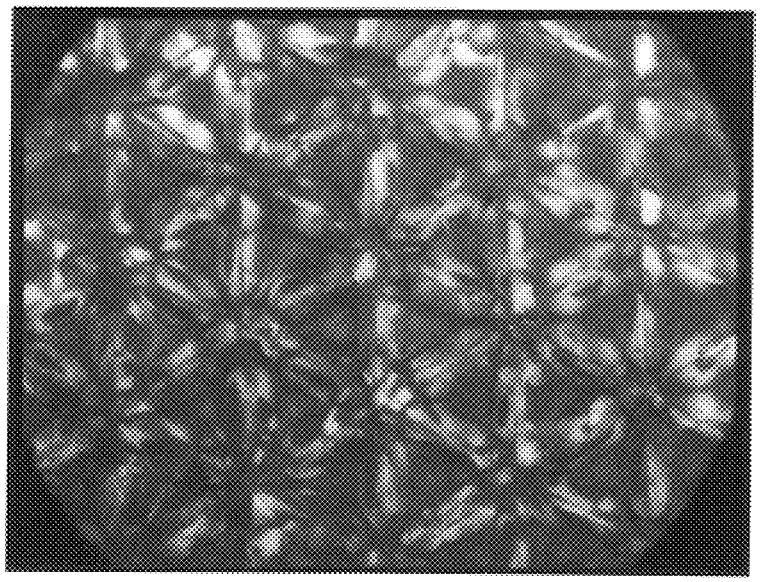
FIG. 10 is a front view of the retroreflective structure with an application of a lot of chemical formulation.
Figure 11:
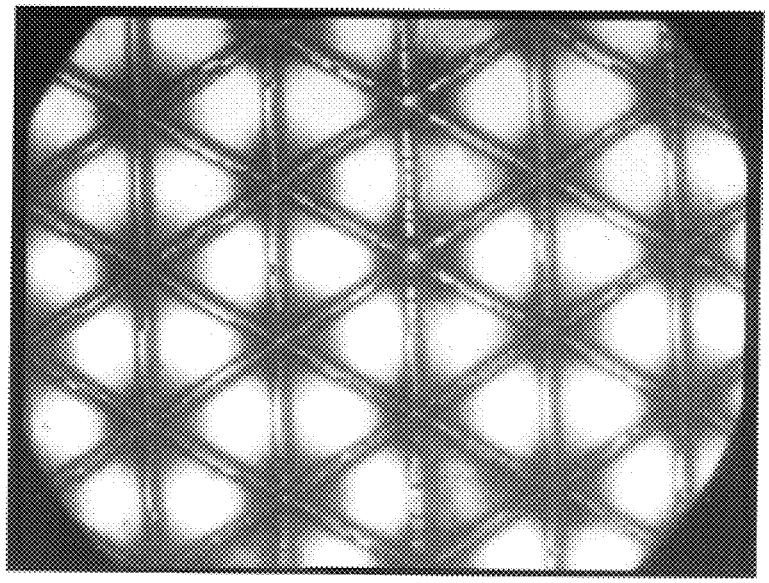
FIG. 11 is a front view of the retroreflective structure with an application of an excessive amount of chemical formulation.
Figure 15:
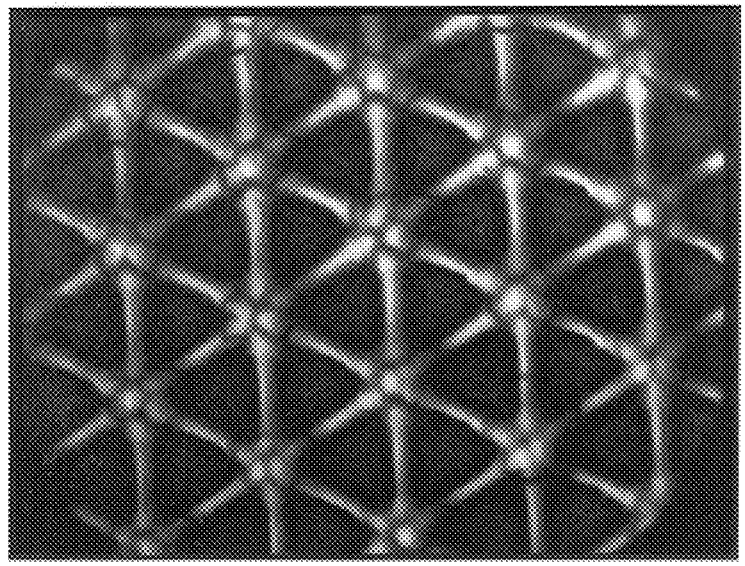
FIG. 15 is a rear side (prism apex side) view of the retroreflective structure with an application of a lot of chemical formulation.
Figure 16:
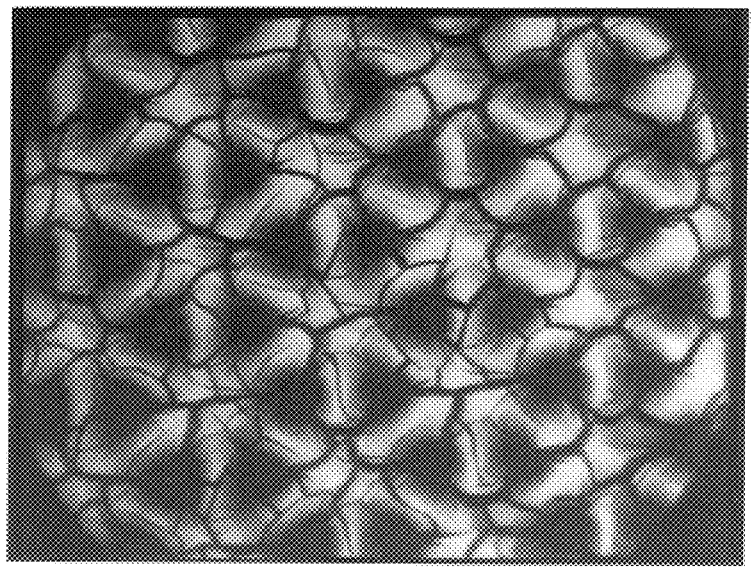
FIG. 16 is a rear side (prism apex side) view of the retroreflective structure with an application of an excessive amount of chemical formulation.

Sample D represents a lot of chemical formulation shown in FIGS. 10 and 15, and too much chemical formulation applied to the retroreflective structure, shown in FIGS. 11 and 16. A lot of formulation can be covering substantially all of the prisms. Too much formulation can be a flooded array of prisms.

The relative intensity plots, shown in FIGS. 17, 18, 19 and 20, display that there is still retroreflectivity from the prisms after the formulation is applied indicating that the chemical formulation flowed down into the grooves between the prisms leaving the apex end of the prisms clean and still having the ability to totally internally reflect light. The prism faces do not reflect light if a residue is left on the faces. The test demonstrates that a product which has high Cap Y (whiteness), because of the color of the chemical formulation, can have small and also varying in size cube corner prisms (prism size depends on the amount of chemical formulation applied) and therefore gives a uniform light distribution. Such a product is very useful for graphics applications and other applications where a high degree of day time color is required and a lower degree of nighttime retroreflectivity is needed.

EQUIVALENTS

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method of forming retroreflective sheeting comprising the steps of:
   a) forming an array of microprisms in a sheet of material, the microprisms each having a base facet with side facets extending therefrom the meeting at an apex; and
   b) forming a reflective coating with reflective metallic deposits on selective portions of the side facets of the microprisms while not depositing, nor previously depositing, the reflective coating on the remaining portions of the microprism facets.

2. The method of claim 1 including the step of forming a colored non-reflective coating over some of the facets having no reflective coating.

3. The method of claim 1 including the step of forming an air space adjacent the facets having no reflective coating.

4. The method of claim 1 wherein only an extended portion of the side facets where they meet at the apex is reflectively coated thereby forming a relatively small retroreflective microprism surface area.

5. Sheeting made in accordance with the method of claim 1.

6. A method of forming retroreflective sheeting comprising the first steps of:
   a) forming a first array of microprisms in a sheet of material, the microprisms each having a base facet with side facets extending therefrom and meeting at an apex;
   b) forming a reflective coating with reflective metallic deposits on selective portions of the surface areas of the side facets of the microprisms in the first array while not depositing the reflective coating on the remaining surface areas of microprism facets in the first array;
   c) forming a first transparent coating over the first array;
   d) forming a second array of microprisms in a sheet of material, the microprisms each having a base facet with side facets extending therefrom and meeting at an apex;
   e) forming a reflective coating with reflective metallic deposits on selective portions of the surface areas of the side facets of the microprisms in the second array while not depositing the reflective coating on the remaining surface areas of microprism facets in the second array; and
   f) bonding the first and second arrays together.

7. Sheeting made in accordance with the method of claim 6.

8. Retroreflective sheeting comprised of an array of prisms formed on a sheet, each prism comprising a solid body having a base side with facet sides extending to an apex, with some of said prisms having the side facets selectively covered with reflective material including metallic deposits, the remaining portions of the microprism facets not having, nor previously having, any reflective material deposited thereon.

9. The sheeting of claim 8 wherein the partially covered prisms are covered by light reflective material at an area around the apex.

10. The sheeting of claim 8 wherein a colored backing is bonded to the uncovered facets.

11. The sheeting of claim 8 which comprises a structure selected from the group of structures including traffic control materials, vehicle markings, photoelectric sensors, internally illuminated articles, partially light transmissive signs, directional reflectors, garments and markings.

12. Retroreflective sheeting comprising:
   a) a body member having a planar face and closely spaced microprisms, each having a base adjacent said planar face from which side facets extend which intercept at a tip;
   b) a reflective interface for said microprisms formed with reflective material including metallic deposits on selective portions of the side facets of some of the microprisms, the remaining portions of the microprism facets not having, nor previously having any reflective material deposited thereon; and
   c) non-reflective covering over the side facet surfaces of some of said microprism facets having no reflective interface whereby lights rays impinging on said first planar face and thereafter impinging upon the base of microprisms having reflective interfaces are retroreflected thereby in the direction from which they came and those impinging upon the base of microprisms having a non-reflective covering are refracted therefrom.

13. The retroreflective sheeting in accordance with claim 12 wherein said reflective interface is comprised of a metallic layer and the non-reflective covering is a colored adhesive coating.

14. The retroreflective sheeting in accordance with claim 13 wherein the reflective interface is disposed on only a tip portion of the microprisms.

15. The retroreflective sheeting in accordance with claim 12 wherein a fabric is bonded to said coating.

16. The retroreflective sheeting in accordance with claim 12 wherein some of said microprisms have an air interface formed about substantially the entire side facet surface.

17. The sheeting of claim 12 which comprises a structure selected from the group of structures including traffic control materials, vehicle markings, photoelectric sensors, internally illuminated articles, partially light transmissive signs, directional reflectors, garments and markings.

* * * * *

UNITED STATES PATENT AND TRADEMARK OFFICE
CERTIFICATE OF CORRECTION

PATENT NO. : 6,139,158
DATED : October 31, 2000
INVENTOR(S) : Robert B. Nilsen and Michael Hanrahan It is certified that error appears in the above-identified patent and that said Letters Patent is hereby corrected as shown below:

Claim 1, Column 7, at Line 64, delete the word "the" and substitute the word -- and-- therefor.

Claim 8, Column 8, at Line 64, add a comma after the second occurrence of the word "having" so that it reads "having,".

Signed and Sealed this

Twenty-second Day of May, 2001

*Attest:*

NICHOLAS P. GODICI

*Attesting Officer*     *Acting Director of the United States Patent and Trademark Office*